(12) United States Patent
Harada et al.

(10) Patent No.: US 10,632,542 B2
(45) Date of Patent: Apr. 28, 2020

(54) CUTTING TOOL AND MANUFACTURING METHOD THEREOF

(71) Applicant: SUMITOMO ELECTRIC HARDMETAL CORP., Itami-shi (JP)

(72) Inventors: Gaku Harada, Itami (JP); Yoshinori Tanigawa, Itami (JP); Satoru Kukino, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 0 days.

(21) Appl. No.: 15/764,125

(22) PCT Filed: Aug. 25, 2017

(86) PCT No.: PCT/JP2017/030557
§ 371 (c)(1),
(2) Date: Mar. 28, 2018

(87) PCT Pub. No.: WO2018/116524
PCT Pub. Date: Jun. 28, 2018

(65) Prior Publication Data
US 2019/0054545 A1 Feb. 21, 2019

(30) Foreign Application Priority Data

Dec. 20, 2016 (JP) .................................. 2016-246683

(51) Int. Cl.
*B23B 27/20* (2006.01)
*B23C 5/16* (2006.01)
(Continued)

(52) U.S. Cl.
CPC ............ *B23B 27/20* (2013.01); *B23B 27/143* (2013.01); *B23C 5/165* (2013.01); *B23D 77/006* (2013.01);
(Continued)

(58) Field of Classification Search
CPC ........ B23B 2200/081; B23B 2200/121; B23B 2200/321; B23B 2200/323;
(Continued)

(56) References Cited

U.S. PATENT DOCUMENTS

| 2,322,894 A | * | 6/1943 | Stevens | ................... B23B 51/02 |
| | | | | 408/230 |
| 2,645,471 A | * | 7/1953 | King | ..................... E21C 35/183 |
| | | | | 175/435 |

(Continued)

FOREIGN PATENT DOCUMENTS

| EP | 1806192 A1 | * | 7/2007 | ......... B23B 27/1614 |
| JP | 55037205 A | * | 3/1980 | ........... B23B 27/143 |

(Continued)

OTHER PUBLICATIONS

Office Action dated Jun. 11, 2019 in corresponding JP Patent Application No. 2018-511160.

*Primary Examiner* — Sara Addisu
(74) *Attorney, Agent, or Firm* — Baker Botts L.L.P.; Michael A. Sartori (57) ABSTRACT

A cutting tool according to an aspect of the present disclosure includes a cutting edge portion which contains at least one of cubic boron nitride and polycrystalline diamond. The cutting edge portion includes a flank face, a negative land contiguous to the flank face, and a cutting edge formed by a ridgeline between the flank face and the negative land. At least one of the negative land and the flank face is provided with a plurality of recesses and a projection. The projection is formed by arranging the edges of adjacent recesses in contact with each other.

9 Claims, 6 Drawing Sheets

(51) Int. Cl.
  *B23P 15/46* (2006.01)
  *B23D 77/00* (2006.01)
  *B23K 26/352* (2014.01)
  *B23B 27/14* (2006.01)

(52) U.S. Cl.
  CPC ............ *B23K 26/355* (2018.08); *B23P 15/46* (2013.01); *B23B 2200/081* (2013.01); *B23B 2200/121* (2013.01); *B23B 2200/321* (2013.01); *B23B 2200/323* (2013.01); *B23B 2226/12* (2013.01); *B23B 2226/125* (2013.01); *B23B 2226/315* (2013.01); *B23C 2200/121* (2013.01); *B23C 2200/323* (2013.01); *B23C 2226/12* (2013.01); *B23C 2226/125* (2013.01); *B23C 2226/315* (2013.01); *B23D 2277/2435* (2013.01)

(58) Field of Classification Search
  CPC .......... B23B 2226/12; B23B 2226/125; B23B 2226/315; B23B 27/143; B23B 27/20; B23C 2200/121; B23C 2200/323; B23C 2226/12; B23C 2226/125; B23C 2226/315; B23C 5/165; B23D 2277/2435; B23K 26/355
  See application file for complete search history.

(56) References Cited

U.S. PATENT DOCUMENTS

| | | | | |
|---|---|---|---|---|
| 4,189,265 A * | 2/1980 | Arnold | B23B 27/143 407/114 |
| 4,259,033 A * | 3/1981 | McCreery | B23B 27/145 407/114 |
| 4,359,300 A * | 11/1982 | Hazra | B23B 27/143 407/114 |
| 4,616,963 A * | 10/1986 | Habert | B23B 27/22 407/114 |
| 4,681,486 A * | 7/1987 | Hale | B23B 27/141 407/114 |
| 4,787,784 A * | 11/1988 | Bernadic | B23B 27/143 407/114 |
| 5,006,020 A * | 4/1991 | Roos | B23B 27/145 407/113 |
| 5,074,720 A * | 12/1991 | Loqvist | B23C 5/202 407/114 |
| 5,221,164 A * | 6/1993 | Allaire | B23C 5/207 407/113 |
| 5,302,060 A * | 4/1994 | Nystrom | B23B 27/1603 407/116 |
| 5,525,016 A * | 6/1996 | Paya | B23B 27/141 407/116 |
| 5,549,425 A * | 8/1996 | Bernadic | B23B 27/065 407/114 |
| 5,695,303 A * | 12/1997 | Boianjiu | B23B 27/141 407/114 |
| 5,725,334 A * | 3/1998 | Paya | B23B 27/045 407/104 |
| 5,779,401 A * | 7/1998 | Stallwitz | B23B 27/045 407/11 |
| 5,788,427 A * | 8/1998 | Zitzlaff | B23B 27/141 407/114 |
| 6,241,430 B1 * | 6/2001 | Norstrom | B23B 27/143 407/114 |
| 6,447,218 B1 * | 9/2002 | Lagerberg | B23B 27/10 407/114 |
| 6,612,786 B1 * | 9/2003 | Kanada | B23B 27/145 407/118 |
| 6,737,178 B2 * | 5/2004 | Ota | C04B 41/009 407/119 |
| 6,957,933 B2 * | 10/2005 | Pachao-Morbitzer | B23B 27/065 407/11 |
| 7,322,776 B2 * | 1/2008 | Webb | B23B 27/145 407/113 |
| 7,455,483 B2 * | 11/2008 | Koskinen | B23B 27/16 407/113 |
| 7,592,077 B2 * | 9/2009 | Gates, Jr. | B23B 27/148 428/698 |
| 9,278,395 B2 * | 3/2016 | Matsuo | B23C 5/109 |
| 9,539,658 B2 * | 1/2017 | Eigenmann | B23D 77/02 |
| 9,731,354 B2 * | 8/2017 | Kondameedi | B23B 27/005 |
| 2003/0219320 A1 * | 11/2003 | Horiike | B23C 5/1045 407/113 |
| 2004/0007115 A1 * | 1/2004 | Schwaner | B23C 5/205 83/835 |
| 2006/0275088 A1 * | 12/2006 | Lehto | B23C 5/1045 407/40 |
| 2007/0116531 A1 * | 5/2007 | Okita | B23B 27/143 407/114 |
| 2008/0025802 A1 * | 1/2008 | Kukino | B23B 27/145 407/42 |
| 2008/0193231 A1 * | 8/2008 | Jonsson | B23B 27/10 407/11 |
| 2008/0193724 A1 * | 8/2008 | Okamura | B23B 27/141 428/192 |
| 2009/0232611 A1 * | 9/2009 | Omori | B23B 27/1662 407/114 |
| 2009/0274524 A1 * | 11/2009 | Hidai | B24D 7/063 407/34 |
| 2015/0016902 A1 * | 1/2015 | Okamura | B23B 27/145 407/116 |
| 2015/0043981 A1 * | 2/2015 | Nagami | B23C 5/06 407/113 |
| 2015/0283617 A1 * | 10/2015 | Nagarajan | B23B 27/143 407/114 |
| 2015/0321262 A1 | 11/2015 | Kondameedi et al. | |
| 2016/0243624 A1 * | 8/2016 | Tomoda | B23B 27/143 |
| 2017/0209935 A1 * | 7/2017 | Furusawa | B23B 27/14 |
| 2018/0318939 A1 * | 11/2018 | Harada | B23B 51/00 |

FOREIGN PATENT DOCUMENTS

| | | |
|---|---|---|
| JP | H2-61508 U | 5/1990 |
| JP | 06-297207 A | 10/1994 |
| JP | 10217008 A * | 8/1998 |
| JP | 2012-110963 A | 6/2012 |
| JP | 2013-212572 A | 10/2013 |
| JP | 2014-046407 A | 3/2014 |
| JP | 2016-190275 A | 11/2016 |
| JP | 2016-204684 A | 12/2016 |
| WO | 94/22622 A1 | 10/1994 |
| WO | WO-2019017064 A1 * | 1/2019 |

\* cited by examiner

CUTTING TOOL AND MANUFACTURING METHOD THEREOF

TECHNICAL FIELD

The present disclosure relates to a cutting tool and a manufacturing method thereof. The present application claims the priority benefit of Japanese Patent Application No. 2016-246683 filed on Dec. 20, 2016, the contents of which are incorporated herein by reference in its entirety.

BACKGROUND ART

As a conventional cutting tool, Japanese Patent Laying-Open No. 2013-212572 (PTD 1) discloses a cutting tool. The cutting tool disclosed in PTD 1 includes a cutting edge, and a rake face contiguous to the cutting edge. The rake face is provided with a surface texture containing a plurality of recesses. The recesses are provided intermittently in the chip discharge direction (the direction substantially perpendicular to the cutting edge). With such a configuration, it is possible for the cutting tool described in PTD 1 to greatly reduce the cutting force and the thrust force, and it is possible for it to efficiently discharge relatively thin chips.

CITATION LIST

Patent Document

PTD 1: Japanese Patent Laying-Open No. 2013-212572

SUMMARY OF THE PRESENT DISCLOSURE

A cutting tool according to an aspect of the present disclosure includes a cutting edge portion which contains at least one of cubic boron nitride and polycrystalline diamond. The cutting edge portion includes a flank face, a negative land contiguous to the flank face, and a cutting edge formed by a ridgeline between the flank face and the negative land. At least one of the negative land and the flank face is provided with a plurality of recesses and a projection. The projection is formed by arranging the edges of adjacent recesses in contact with each other.

DETAILED DESCRIPTION

[Problem to be Solved by the Present Disclosure]

In consideration of the difficulty in cutting a workpiece, it can not be said that the cutting resistance of the cutting tool disclosed in PTD 1 is sufficiently low, and there is a room left for reducing the cutting resistance.

The present disclosure has been made in view of the above-mentioned problems in the prior art. More specifically, the present disclosure provides a cutting tool with reduced cutting resistance and a method for manufacturing the cutting tool.

[Advantageous Effect of the Present Disclosure]

According to the cutting tool of an aspect of the present disclosure, it is possible to reduce the cutting resistance.

[Description of Embodiments]

First, aspects of the present disclosure will be described hereinafter.

(1) A cutting tool according to one aspect of the present disclosure includes a cutting edge portion which contains at least one of cubic boron nitride and polycrystalline diamond. The cutting edge portion includes a flank face, a negative land contiguous to the flank face, and a cutting edge formed by a ridgeline between the flank face and the negative land. At least one of the negative land and the flank face is provided with a plurality of recesses and a projection. The projection is formed by arranging the edges of adjacent recesses in contact with each other. In the present disclosure, the expression that "at least one of the negative land and the flank face is provided with a plurality of recesses and a projection" means that there are 3 possibilities for providing the plurality of recesses and the projection, specifically, the plurality of recesses and the projection are provided only on the negative land (without being provided on the flank face at the same time), the plurality of recesses and the projection are provided only on the flank face (without being provided on the negative land at the same time), the plurality of recesses and the projection are provided both on the negative land and on the flank face.

According to the cutting tool described in the above (1), it is possible to reduce the cutting resistance. Further, according to the cutting tool described in the above (1), it is possible to improve the cooling effect by the cutting fluid.

(2) In the cutting tool described in the above (1), the plurality of recesses and the projection may be provided only on the negative land. According to the cutting tool described in the above (2), it is possible to reduce the cutting resistance of the negative land.

(3) In the cutting tool described in the above (2), a recess of the plurality of recesses which is provided closest to the cutting edge may be separated by a distance from the cutting edge. According to the cutting tool described in the above (3), it is possible to break the chips finely.

(4) In the cutting tool described in the above (1), the plurality of recesses and the projection may be provided only on the flank face. According to the cutting tool described in the above (4), it is possible to reduce the cutting resistance of the flank face.

(5) In the cutting tool described in the above (1), the plurality of recesses may be provided on both the negative land and the flank face. According to the cutting tool described in the above (5), it is possible to reduce the cutting resistance of both the negative land and the flank face.

(6) In the cutting tools described in the above (1) to (5), the depth of each recess may be 0.05 µm or more and 20 µm or less. According to the cutting tool described in the above (6), it is possible to prevent the projections from getting fractured while improving the cooling effect by the cutting fluid.

(7) In the cutting tools described in the above (1) to (6), the arithmetic average roughness of the surface of each recess may be 0.05 µm or more and 1.5 µm or less. According to the cutting tool described in the above (7), it is possible to suppress the adhesion of chips cut from the workpiece to the recess.

(8) In the above cutting tools (1) to (7), the distance between a recess of the plurality of recesses which is provided closest to the cutting edge and the cutting edge may be 5 µm or less. According to the cutting tool described in the above (8), it is possible to reduce the cutting resistance even when the cutting is performed with a small cut.

(9) A method for manufacturing a cutting tool according to one aspect of the present disclosure is a method for manufacturing a cutting tool including a cutting edge portion which contains at least one of cubic boron nitride and polycrystalline diamond. The cutting edge portion includes a flank face, a negative land contiguous to the flank face, and a cutting edge formed by a ridgeline between the flank face and the negative land. The method for manufacturing a cutting tool according to one aspect of the present disclosure includes a step of irradiating at least one of the negative land and the flank face with laser so as to form a plurality of recesses on the surface irradiated with laser and a plurality of projection formed by arranging the edges of adjacent recesses in contact with each other. According to the manufacturing method described in the above (9), it is possible to obtain a cutting tool with reduced cutting resistance.

(10) The method for manufacturing a cutting tool according to (9) may further include a step of irradiating the cutting tool with laser so as to form the flank face, the negative land and the cutting edge. According to the manufacturing method described in the above (10), it is possible to arrange the recesses accurately with respect to the cutting edge.

[DETAILS OF EMBODIMENTS OF THE PRESENT DISCLOSURE]

Hereinafter, embodiments of the present disclosure will be described in detail with reference to the drawings. It should be noted that in the drawings, the same or corresponding parts are denoted by the same reference numerals. In addition, at least some of the embodiments described below may be arbitrarily combined.

(First Embodiment)

Hereinafter, the configuration of a cutting tool according to a first embodiment will be described.

Figure 1:
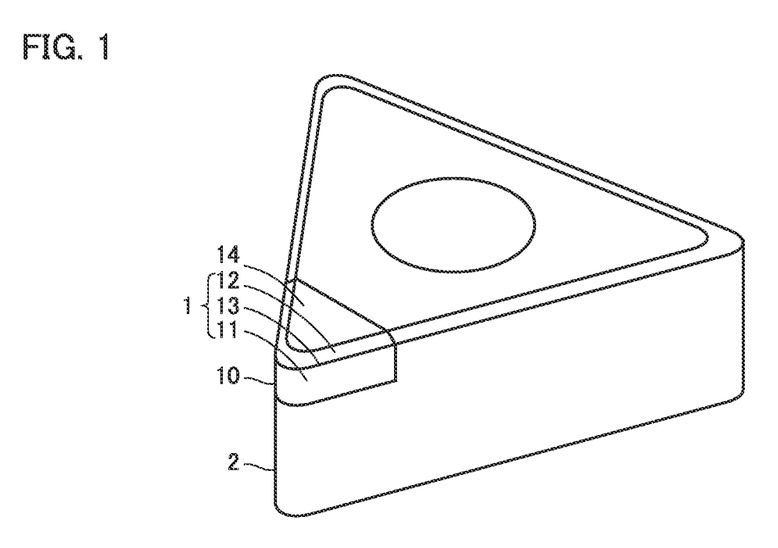
FIG. 1 is a perspective view illustrating a cutting tool according to a first embodiment.

FIG. 1 is a perspective view illustrating a cutting tool according to the first embodiment. As illustrated in FIG. 1, the cutting tool according to the first embodiment is, for example, a cutting insert. However, the cutting tool according to the first embodiment is not limited to the cutting insert. The cutting tool according to the first embodiment may be, for example, an end mill or a reamer.

The cutting tool according to the first embodiment includes a cutting edge portion 1. The cutting edge portion 1 includes a flank face 11, a negative land 12, and a cutting edge 13. The negative land 12 is contiguous to a top face 14 so as to form a negative angle with respect to the top face 14. The expression that the negative land 12 forms a negative angle with respect to the top face 14 means that in a state where the top face 14 faces upward and the cutting edge 13 faces leftward, the negative land 12 rotates counterclockwise with respect to the top face 14. The negative land 12 and the top face 14 constitute a rake face of the cutting tool according to the first embodiment. The negative land 12 is contiguous to the flank face 11. The cutting edge 13 is formed by a ridge line between the flank face 11 and the negative land 12.

The cutting edge portion 1 is a part of the cutting edge chip 10 made of a sintered material containing at least one of cubic boron nitride (CBN) and polycrystalline diamond (PCD), for example. The cutting edge portion 1 may be a part of a cutting tool made of a sintered material containing at least one of CBN and PCD. Further, the cutting edge portion 1 may be a part of a cutting tool made of a base material such as cemented carbide and at least one of CBN and PCD coated on the surface of the base material. In summary, the cutting edge portion 1 may only need to contain one of CBN and PCD on at least its surface. The volume ratio of CBN, the volume ratio of PCD or the total volume ratio of CBN and PCD contained in the cutting edge portion 1 is preferably 20 volume % or more. If the cutting edge portion 1 is a part of the cutting edge chip 10 made of a sintered material containing at least one of CBN and PCD, the cutting edge chip 10 is attached to a base metal 2 made of cemented carbide or the like via brazing, for example.

Figure 2A:
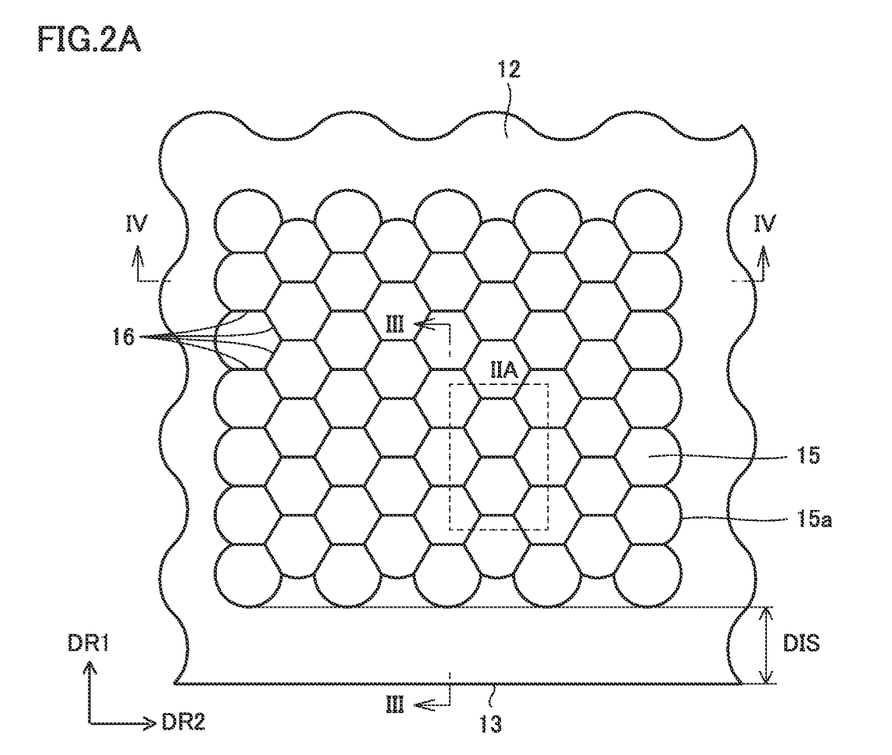
FIG. 2A is an enlarged plan view illustrating a negative land of the cutting tool according to the first embodiment.
Figure 2B:
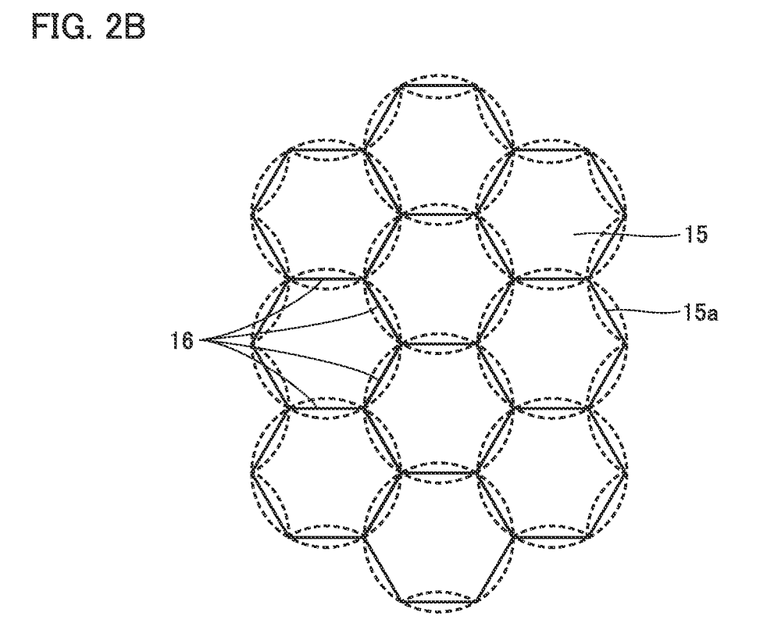
FIG. 2B is an enlarged view illustrating a main part of FIG. 2A.
Figure 3:
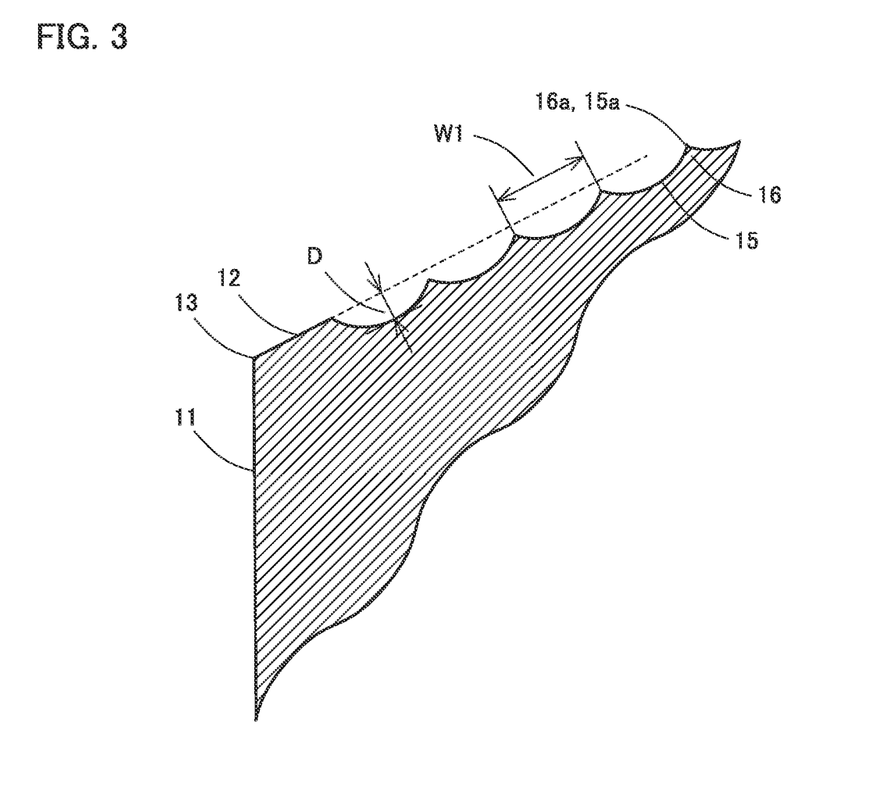
FIG. 3 is a cross-sectional view taken along line of FIG. 2A.
Figure 4:
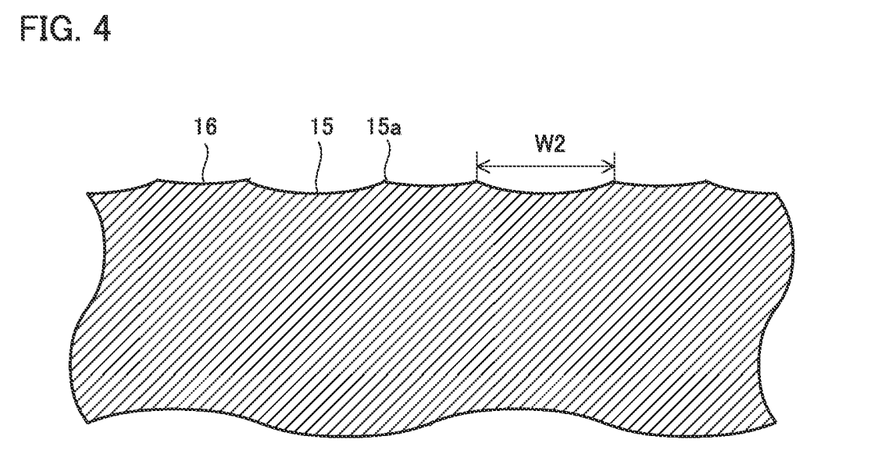
FIG. 4 is a cross-sectional view taken along line IV-IV of FIG. 2A.

FIG. 2A is an enlarged plan view illustrating a negative land of the cutting tool according to the first embodiment. FIG. 2B is an enlarged view illustrating a main part of FIG. 2A. FIG. 3 is a cross-sectional view taken along line of FIG. 2A. FIG. 4 is a cross-sectional view taken along line IV-IV of FIG. 2A. It should be noted that line is in the same direction as a first direction DR1 to be described later, and line IV-IV is in the same direction as a second direction DR2 to be described later.

As illustrated in FIGS. 2A, 2B, 3 and 4, a plurality of recesses 15 are provided on the negative land 12. Thereby, the negative land 12 is recessed where a recess 15 is provided. The plurality of recesses 15 are arranged in such a manner that no flat surface is present between adjacent recesses 15. In other words, each recess 15 has an edge 15a, and the edges 15a of the adjacent recesses 15 are contiguous to each other. The plurality of recesses 15 are arranged, for example, in a zigzag manner.

From another viewpoint, the plurality of recesses 15 may be provided in such a manner that parts of the adjacent recesses 15 circular in plan view are sequentially overlapped with each other (the overlapped portions are indicated by dotted lines in FIG. 2B). As to be described later, a projection 16 is formed in the overlapped portion.

More specifically, a plurality of recesses 15 are arranged both in column along the first direction DR1 and in row along the second direction DR2, and the adjacent recesses 15 are contiguous to each other. The first direction DR1 is a direction intersecting the cutting edge 13. The first direction DR1 is preferably orthogonal to the cutting edge 13. The second direction DR2 is a direction parallel to the cutting edge 13. The second direction DR2 may be orthogonal to the first direction DR1.

It is preferable that the recesses 15 provided closest to the cutting edge 13 are arranged to be separated from the cutting edge 13. It is preferable that the recesses 15 provided closest to the cutting edge 13 and the cutting edge 13 are separated by a distance DIS. The distance DIS is preferably 5 μm or less.

As illustrated in FIG. 3, it is preferable that the recess 15 is circular or elliptical in cross section, but the shape of the recess 15 in cross section is not limited thereto.

The recess 15 has a first width W1 in the first direction DR1. The first width W1 is the maximum width of the recess 15 in the first direction DR1. The first width W1 is preferably greater than 10 μm and less than 100 μm. The recess 15 has a second width W2 in the second direction DR2. The second width W2 is the maximum width of the recess 15 in the second direction DR2. The second width W2 is preferably not less than the first width W1 and not more than ten times of the first width W1.

The recess 15 has a depth D. The depth D is the distance between the surface of a portion of the negative land 12 where neither the recess 15 nor the projection 16 is provided and the bottom of the recess 15. The depth D is preferably 0.05 μm or more and 20 μm or less.

The arithmetic average roughness Ra of the surface of the recess 15 is preferably 0.05 μm or more and 1.5 μm or less. The arithmetic average roughness Ra of the surface of the recess 15 is measured by using a laser displacement meter.

The negative land 12 is provided with a projection 16. It is preferable that a plurality of projections 16 are provided. The projection 16 projects in a direction intersecting the negative land 12. The projection 16 is formed by arranging the edges 15a of the adjacent recesses 15 in contact with each other. From another viewpoint, the projection 16 is formed in a portion where the adjacent recesses 15 are partly overlapped in plan view. Therefore, the projection 16 is provided in the region where the plurality of recesses 15 are formed. Since the projection 16 is formed by arranging the edges 15a of the adjacent recesses 15 in contact with each other (it is formed in a portion where the adjacent recesses 15, each of which is circular in plan view, are partially overlapped), it is sharp at a tip 16a. In other words, the projection 16 has no flat surface at the tip 16a.

As described in the above, since the projection 16 is formed by arranging the edges 15a of the adjacent recesses 15 in contact with each other, the tip 16a of the projection 16 matches the edge 15a of the recess 15. Since the projection 16 contains at least one of CBN and PCD, it is less prone to be worn due to the contact with the workpiece as compared with the case where the projection 16 is made of cemented carbide or the like.

As described in the above, since the recesses 15 are arranged along the first direction DR1, the projection 16 includes a portion extending in a direction orthogonal to the first direction DR1. Since the first direction DR1 is a direction intersecting the cutting edge 13, the projection 16 includes a portion extending in a direction intersecting the direction orthogonal to the cutting edge 13.

Hereinafter, a method for manufacturing a cutting tool according to the first embodiment will be described.

Figure 5:
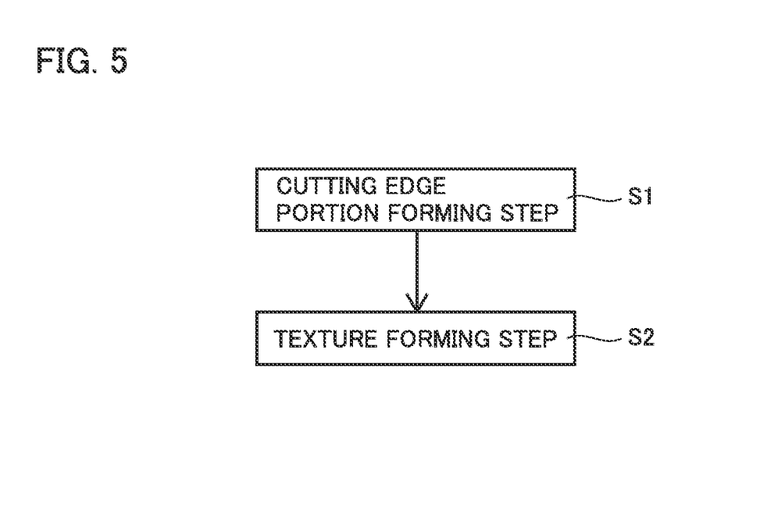
FIG. 5 is a process chart illustrating a method for manufacturing the cutting tool according to the first embodiment.

FIG. 5 is a process chart illustrating the method for manufacturing the cutting tool according to the first embodiment. As illustrated in FIG. 5, the manufacturing method includes a cutting edge portion forming step S1 and a texture forming step S2.

Figure 6:
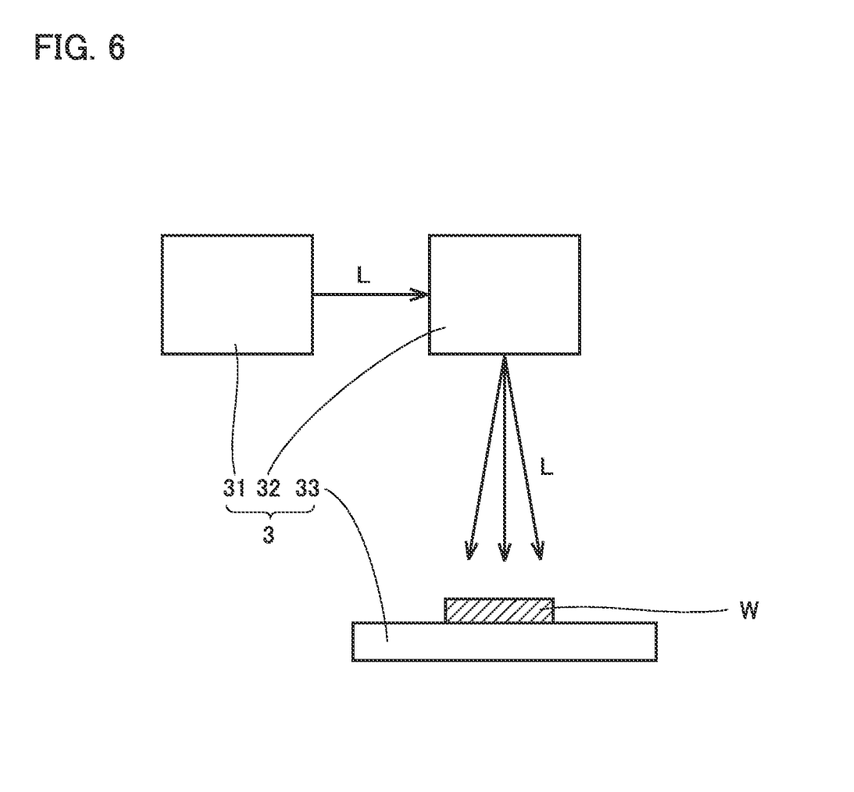
FIG. 6 is a schematic view illustrating a machining apparatus used in the method for manufacturing the cutting tool according to the first embodiment.

FIG. 6 is a schematic view illustrating a machining apparatus used in the method for manufacturing the cutting tool according to the first embodiment. As illustrated in FIG. 6, the machining apparatus 3 used in the method for manufacturing the cutting tool according to the first embodiment includes a light source 31, a scanner head 32, and a machining stage 33.

The light source 31 supplies laser L to the scanner head 32. A workpiece W is placed on the machining stage 33. The scanner head 32 scans the surface of the workpiece W with laser L supplied from the light source 31. The scanner head 32 is, for example, a galvanometer scanner.

The texture forming step S2 is performed by using the machining apparatus 3. It is preferable that the cutting edge portion forming step Si is also performed by using the machining apparatus 3. In other words, it is preferable that both the cutting edge portion forming step S1 and the texture forming method are performed through the irradiation of laser L.

Figure 7:
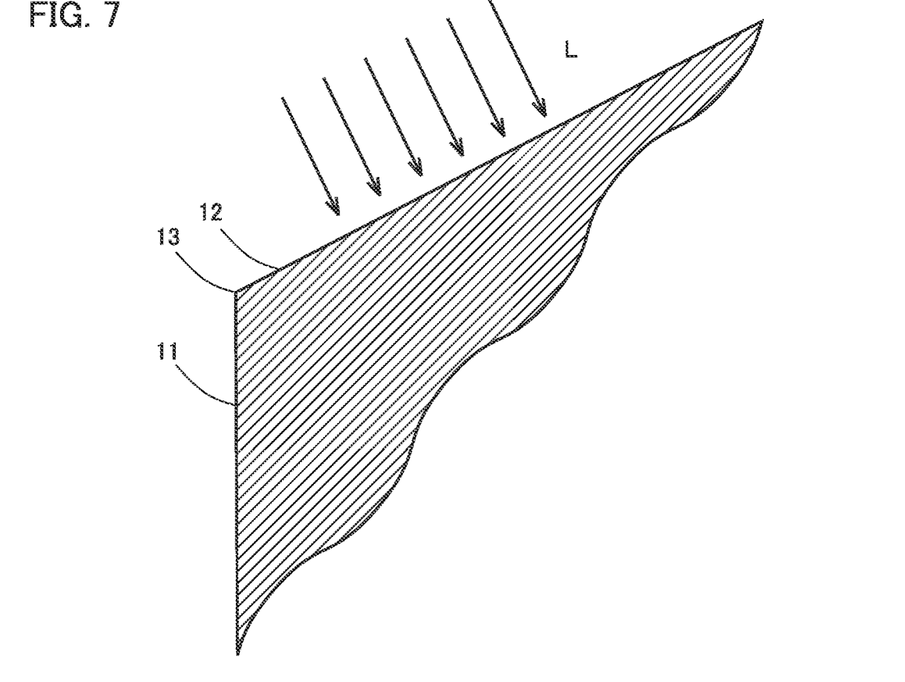
FIG. 7 is a cross-sectional view illustrating a portion in the vicinity of the cutting edge portion of the cutting tool in the cutting edge portion forming step according to the first embodiment.

FIG. 7 is a cross-sectional view illustrating a portion in the vicinity of the cutting edge portion of the cutting tool in the cutting edge portion forming step according to the first embodiment. As illustrated in FIG. 7, the cutting edge portion 1 having the flank face 11, the negative land 12 and the cutting edge 13 is formed in the cutting edge portion forming step S1. The formation of the cutting edge portion 1 having the flank face 11, the negative land 12 and the cutting edge 13 is carried out by irradiating laser L supplied from the light source 31 on the surface of the workpiece W (the face that will become the flank face 11 and the negative land 12 after machining) via the scanner head 32.

Figure 8:
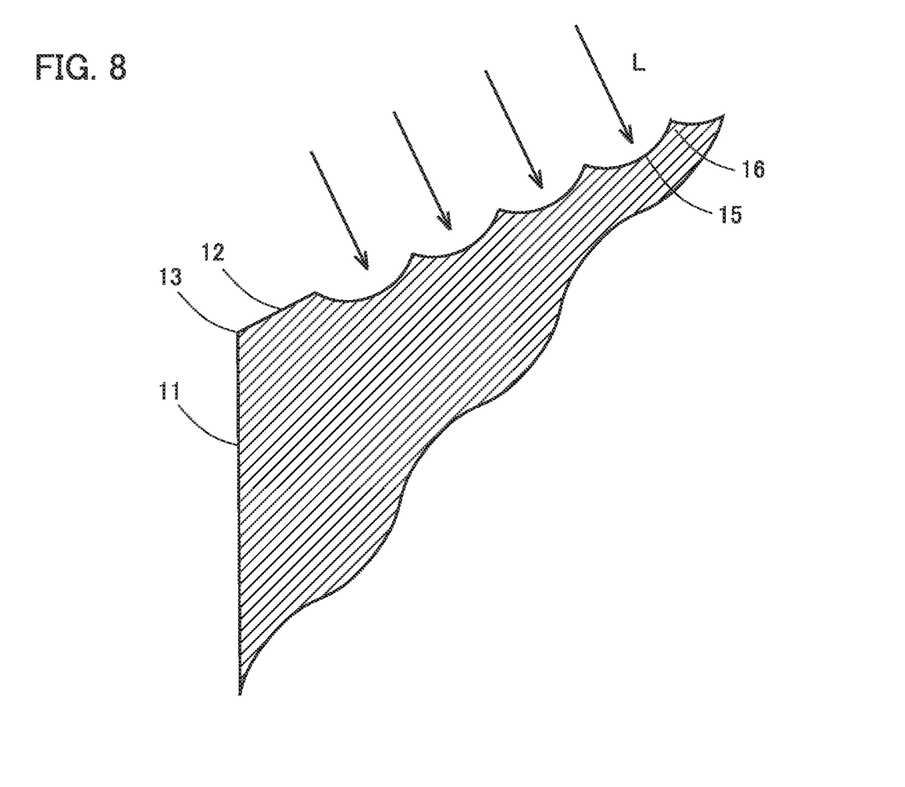
FIG. 8 is a cross-sectional view illustrating a portion in the vicinity of the cutting edge portion of the cutting tool in the texture forming step according to the first embodiment.

FIG. 8 is a cross-sectional view illustrating a portion in the vicinity of the cutting edge portion of the cutting tool in the texture forming step according to the first embodiment. As illustrated in FIG. 8, the texture forming step S2 is performed by irradiating laser L supplied from the light source 31 on the negative land 12 via the scanner head 32.

Figure 9:
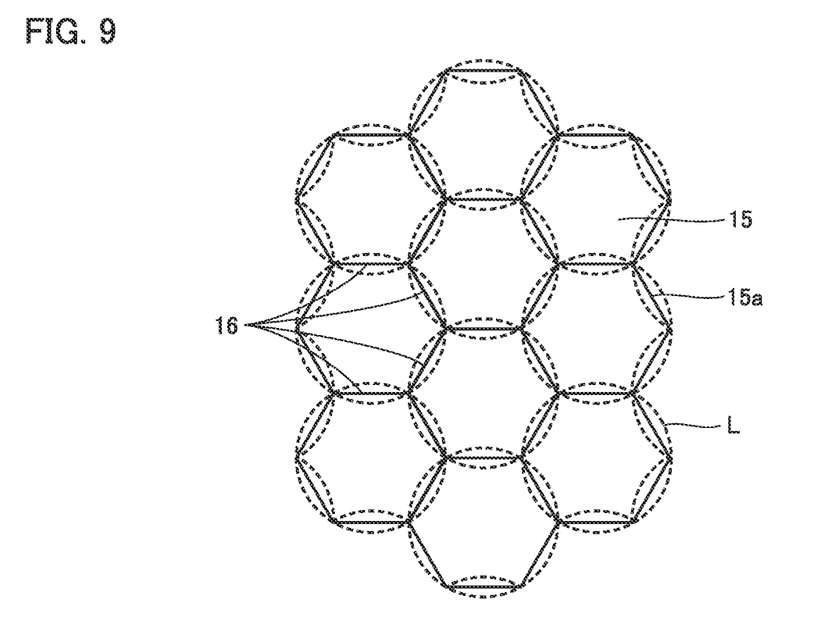
FIG. 9 is an enlarged top view illustrating the cutting tool in the texture forming step according to a first embodiment.

FIG. 9 is an enlarged top view illustrating the cutting tool in the texture forming step according to the first embodiment. In FIG. 9, the scanning range of laser L is indicated by a dotted line. As illustrated in FIG. 9, when forming each of the recesses 15, laser L is made to scan the negative land 12 in a circular pattern in plan view. When forming the adjacent recesses 15, laser L is irradiated in such a manner that the irradiation range of laser L partially overlaps with each other. The projection 16 is formed in the overlapping region. By repetitively irradiating laser L, the projection 16 with a sharp tip 16a is formed in the region where the plurality of recesses 15 are formed, so that the negative land 12 has no flat portion between the adjacent recesses 15.

Effects of the cutting tool and the manufacturing method thereof according to the first embodiment will be described below.

In the cutting tool according to the first embodiment, as described in the above, the plurality of recesses 15 are provided on the negative land 12, and the plurality of recesses 15 are arranged in such a manner that the edges 15a of the adjacent recesses 15 are in contact with each other. Therefore, in the cutting tool according to the first embodiment, no flat surface is present between the adjacent recesses 15, which reduces the contact area between the chips cut from the workpiece and the negative land 12.

Further, in the cutting tool according to the first embodiment, the projection 16 is provided on the negative land 12. In the cutting tool according to the first embodiment, not only the cutting edge 13 but also the projection 16 functions as a cutting edge. Therefore, in the cutting tool according to the first embodiment, the sharpness of the cutting tool is improved. As a result, according to the cutting tool according to the first embodiment, the cutting resistance is reduced.

In the cutting tool according to the first embodiment, since the negative land 12 is recessed where each recess 15 is provided, the cutting fluid is likely to enter the negative land 12. Therefore, in the cutting tool according to the first embodiment, the cooling effect by the cutting fluid is improved.

When the recess 15 located closest to the cutting edge 13 is separated from the cutting edge 13, since the negative land 12 is recessed where each recess 15 is provided, the recess 15 functions as a chip breaker. Accordingly, it is possible to break chips finely, improving the chip disposability of the cutting tool.

If the depth D of the recess 15 is deep, the cutting fluid is more easily to enter the negative land, and thereby, the cooling effect is further improved. However, if the depth of the recess 15 is too deep, the projection 16 becomes too sharp, which makes it easy to break. Therefore, when the depth D of the recessed portion is 0.05 µm or more and 20 µm or less, it is possible to prevent the projection 16 from breaking while improving the cooling effect of the cutting tool.

When the arithmetic average roughness Ra of the surface of the recess 15 is 0.05 µm or more and 1.5 µm or less, chips cut from the workpiece are less likely to adhere to the surface of the recess 15. Accordingly, it is possible to suppress the adhesion of chips to the workpiece.

If the distance DIS between the recess 15 located closest to the cutting edge 13 and the cutting edge 13 is large, when the cutting tool according to the first embodiment is used with a small cut, the recess 15 and the workpiece will not contact each other. When the distance DIS between the recess 15 located closest to the cutting edge 13 and the cutting edge 13 is 5 µm or less, it is possible to reduce the cutting resistance even when the cutting is performed with a minute cut.

According to the method for manufacturing a cutting tool according to the first embodiment, it is possible to obtain a cutting tool with reduced cutting resistance, improved cooling effect by cutting fluid and improved chip disposability.

According to the cutting tool of the first embodiment, when performing not only the texture forming step S2 but also the cutting edge portion forming step Si by irradiating laser L, there is no need to move the workpiece W during the process (it is unnecessary to perform the positioning of the workpiece when transferring it from the cutting edge forming step Si to the texture forming step S2). Accordingly, it is possible to form the recess 15 accurately in relation to the cutting edge 13. As a result, it is possible to make the distance DIS between the recess 15 located closest to the cutting edge 13 and the cutting edge 13 equal to 5 µm or less, for example.

(Second Embodiment)

Hereinafter, the cutting tool according to a second embodiment will be described. In the following, the description will be carried out mainly on the points different from the cutting tool according to the first embodiment, and the duplicate contents will not be repeated.

The cutting tool according to the second embodiment includes a cutting edge portion 1. The cutting edge portion 1 includes a flank face 11, a negative land 12, a cutting edge 13 formed by ridgelines of the flank face 11 and the negative land 12. The cutting edge portion 1 contains at least one of CBN and PCD. In these respects, the cutting tool according to the second embodiment is the same as the cutting tool according to the first embodiment.

Figure 10:
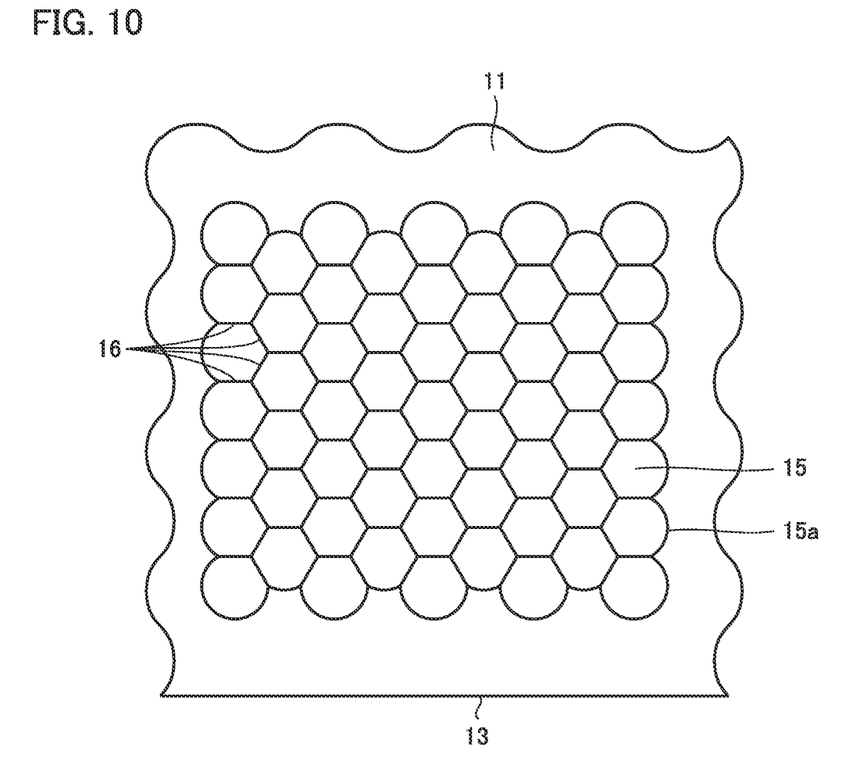
FIG. 10 is an enlarged plan view illustrating a flank face of the cutting tool according to a second embodiment.

FIG. 10 is an enlarged plan view illustrating the flank face of the cutting tool according to the second embodiment. As illustrated in FIG. 10, in the cutting tool according to the second embodiment, the recess 15 and the projection 16 are provided on the flank face 11. In this respect, the cutting tool according to the second embodiment is the same as the cutting tool according to the first embodiment.

The configuration of the recess 15 and the projection 16 in the cutting tool according to the second embodiment, except that they are not provided on the negative land 12 but on the flank face 11, are the same as the configuration of the recess 15 and the projection 16 in the cutting tool according to the first embodiment. In other words, a plurality of recesses 15 are provided in the flank face 11 such that the edges 15a of the adjacent recesses 15 are in contact with each other, and the projection 16 is formed by arranging the edges 15a of the adjacent recesses 15 in contact with each other.

The method for manufacturing the cutting tool according to the second embodiment is similar to the method for manufacturing the cutting tool according to the first embodiment in that it includes a cutting edge portion forming step S1 and a texture forming step S2. However, the texture forming step S2 in the method for manufacturing the cutting tool according to the second embodiment is different from the texture forming step S2 in the method for manufacturing the cutting tool according to the first embodiment in that the recess 15 is formed on the flank face 11 by irradiating the flank face 11 with laser L.

In the method for manufacturing the cutting tool according to the second embodiment, a plurality of recesses 15 are provided on the flank face 11, and the plurality of recesses 15 are arranged so that the edges 15a of the adjacent recesses 15 are in contact with each other. Therefore, in the cutting tool according to the second embodiment, no flat surface is present between adjacent recesses 15, which reduces the contact area between the surface of the workpiece and the flank face 11. In the cutting tool according to the second embodiment, since the flank face 11 is recessed where each recess 15 is provided, the cutting fluid is likely to enter the flank face 11. Therefore, according to the cutting tool according to the second embodiment, it is possible to reduce the cutting resistance and improve the cooling effect by the cutting fluid.

(Third Embodiment)

Hereinafter, the cutting tool according to a third embodiment will be described. In the following, the description will be carried out mainly on the points different from the cutting tool according to the first embodiment and the cutting tool according to the second embodiment, and the duplicate contents will not be repeated.

The cutting tool according to the third embodiment includes a cutting edge portion 1. The cutting edge portion 1 includes a flank face 11, a negative land 12, a cutting edge 13 formed by ridgelines of the flank face 11 and the negative land 12. The cutting edge portion 1 contains at least one of CBN and PCD. In these respects, the cutting tool according to the third embodiment is the same as the cutting tool according to the first embodiment and the cutting tool according to the second embodiment.

In the cutting tool according to the third embodiment, the recess 15 and the projection 16 are provided on the flank face 11. In this respect, the cutting tool according to the third embodiment is different from the cutting tool according to the first embodiment. In the cutting tool according to the third embodiment, the recess 15 and the projection 16 are also provided on the negative land 12. In this respect, the cutting tool according to the third embodiment is different from the cutting tool according to the second embodiment.

In other words, the cutting tool according to the third embodiment has a configuration in which the cutting tool according to the first embodiment and the cutting tool according to the second embodiment are combined.

The method for manufacturing a cutting tool according to the third embodiment is similar to the method for manufacturing a cutting tool according to the first embodiment and the method for manufacturing a cutting tool according to the second embodiment in that it includes a cutting edge portion forming step Si and a texture forming step S2. However, the texture forming step S2 in the method for manufacturing the cutting tool according to the third embodiment is different from the texture forming step S2 in the method for manufacturing the cutting tool according to the first embodiment and the method for manufacturing the cutting tool according to the second embodiment in that both the flank face 11 and the negative land 12 are irradiated with laser L so that the recesses 15 are formed on both the flank face 11 and the negative land 12.

As described in the above, the cutting tool according to the third embodiment has a configuration in which the cutting tool according to the first embodiment and the cutting tool according to the second embodiment are combined. Therefore, according to the cutting tool of the third embodiment, it is possible to reduce the cutting resistance and improve the cooling effect by the cutting fluid.

It should be understood that the embodiments disclosed herein have been presented for the purpose of illustration and description but not limited in all aspects. It is intended that the scope of the present disclosure is not limited to the description above but defined by the scope of the claims and encompasses all modifications equivalent in meaning and scope to the claims.

REFERENCE SIGNS LIST

1: cutting edge portion; 2: base metal; 3: machining apparatus; 10: cutting edge chip; 11: flank face; 12: negative land; 13: cutting edge; 14: top face; 15: recess; 15a: edge; 16: projection; 16a: tip; 31: light source; 32: scanner head; 33: machining stage; D: depth; DIS: distance; DR1: first direction; DR2: second direction; L: laser; S1: cutting edge portion forming step; S2: texture forming step; W: workpiece; W1: first width; W2: second width.

The invention claimed is:

1. A cutting tool comprising a cutting edge portion which contains at least one of cubic boron nitride and polycrystalline diamond,
   the cutting edge portion including a flank face, a negative land contiguous to the flank face, and a cutting edge formed by a ridgeline between the flank face and the negative land,
   at least one of the negative land and the flank face being provided with a plurality of recesses and a projection formed by arranging the edges of adjacent recesses in contact with each other.

2. The cutting tool according to claim 1, wherein the plurality of recesses and the projection are provided only on the negative land.

3. The cutting tool according to claim 2, wherein a recess of the plurality of recesses which is provided closest to the cutting edge is separated by a distance from the cutting edge.

4. The cutting tool according to claim 1, wherein the plurality of recesses and the projection are provided only on the flank face.

5. The cutting tool according to claim 1, wherein the plurality of recesses are provided on both the negative land and the flank face.

6. The cutting tool according to claim 1, wherein the depth of each recess is 0.05 µm or more and 20 µm or less.

7. The cutting tool according to claim 1, wherein the arithmetic average roughness of the surface of each recess is 0.05 µm or more and 1.5 µm or less.

8. The cutting tool according to claim 1, wherein the distance between a recess of the plurality of recesses which is provided closest to the cutting edge and the cutting edge is 5 µm or less.

9. The cutting tool according to claim 1, wherein the plurality of recesses are arranged along the first direction orthogonal to the cutting edge and along the second direction parallel to the cutting edge, and the adjacent recesses are contiguous to each other.

* * * * *